Patented Sept. 8, 1931

1,822,253

UNITED STATES PATENT OFFICE

FERNANDO SOMOZA VIVAS, OF NEW YORK, N. Y., ASSIGNOR TO INTERNATIONAL FIRE-PROOF PRODUCTS CORPORATION, OF NEW YORK, N. Y., A CORPORATION OF DELAWARE

SURFACE SEALING COMPOUND OR STAIN AND PROCESS OF PRODUCING THE SAME

No Drawing. Application filed October 8, 1927. Serial No. 225,034.

The invention relates to surface sealing compounds which may be prepared as a stain if desired and has as an object the provision of a material which may be used to seal the surface of porous material such as timber, wallboard or the like and which will increase the fireproof qualities of the material and make the material waterproof.

An illustrative embodiment of the process for carrying out the objects of the invention is as follows:

A mixture of a hexachlorinated naphthalene, which may be had on the market under the trade-mark of Halowax, with the fireproof varnish described and claimed in my Patent No. 1,612,673 dated December 28, 1926, for fireproof varnish, in the desired proportions of one pound of varnish to four ounces of Halowax is prepared. Rubber is dissolved in benzol in the desired proportions of one ounce of rubber to four ounces of benzol to which solution sufficient perchlormethane is added to make one gallon. The thus prepared solution is added to the mixture of varnish and Halowax to produce a material which is fireproof and which may be applied to porous material to seal the surface thereof thereby making the same waterproof and substantially fireproof.

If it is desired to utilize the material as a stain, any desired colors preferably in the form of metallic pigments may be added to the above described solution. The rubber present in the compound will make the material elastic and, in combination with the varnish, impervious to air and water.

The thus prepared sealing compound may be used to coat timber exposed to weather and is especially desirable for use upon timber treated as described in my Patent No. 1,533,526, or my Patent No. 1,612,676 to increase their durability and fireproof qualities.

Minor changes may be made in the composition of material or in the steps of preparation thereof within the scope of the appended claims without departing from the spirit of the invention.

I claim:

1. A surface sealing compound comprising in combination, hexachlorinated naphthalene, rubber and fireproof varnish.

2. A surface sealing compound comprising in combination, hexachlohinated naphthalene, fireproof varnish and rubber dissolved in benzol.

3. A surface sealing compound comprising in combination, hexachlorinated naphthalene, fireproof varnish and rubber dissolved in benzol and perchlormethane.

4. A surface sealing compound comprising in combination, a mixture of the following substances in substantially the quantities named: fireproof varnish, one pint; hexachlorinated naphthalene, one-fourth pint; rubber, one ounce; benzol, one fourth pint; perchlormethane, seven and one-half pints.

5. The process of producing a surface sealing compound which comprises mixing hexachlorinated naphthalene with fireproof varnish in substantially the proportion of one pound of varnish to four ounces of hexachlorinated naphthalene, making a solution of substantially one ounce of rubber in four ounces of benzol, diluting the solution with perchlormethane to make one gallon and adding the last named solution to the first named mixture.

6. A surface sealing compound comprising, in combination, a major portion of perchlormethane and a minor portion comprising fireproof varnish, hexachlorinated naphthalene, rubber and benzol, the quantity of fireproof varnish exceeding the combined quantities of the last named substances.

FERNANDO SOMOZA VIVAS.